US008854481B2

(12) United States Patent
Jelinek

(10) Patent No.: US 8,854,481 B2
(45) Date of Patent: Oct. 7, 2014

(54) IMAGE STABILIZATION DEVICES, METHODS, AND SYSTEMS

(75) Inventor: Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 13/474,438

(22) Filed: May 17, 2012

(65) Prior Publication Data

US 2013/0308001 A1 Nov. 21, 2013

(51) Int. Cl.
*H04N 5/228* (2006.01)
*H04N 5/225* (2006.01)
*G06K 9/00* (2006.01)
*G06K 9/46* (2006.01)

(52) U.S. Cl.
USPC ............. 348/208.14; 348/169; 348/208.12; 348/222.1; 382/103; 382/190; 382/194

(58) Field of Classification Search
None
See application file for complete search history.

(56) References Cited

U.S. PATENT DOCUMENTS

| | | | | |
|---|---|---|---|---|
| 5,912,980 | A * | 6/1999 | Hunke | 382/103 |
| 6,014,167 | A * | 1/2000 | Suito et al. | 348/169 |
| 6,453,069 | B1 * | 9/2002 | Matsugu et al. | 382/173 |
| 6,661,907 | B2 * | 12/2003 | Ho et al. | 382/118 |
| 7,110,023 | B2 * | 9/2006 | Utsumi et al. | 348/208.14 |
| 7,453,497 | B2 * | 11/2008 | Martins et al. | 348/222.1 |
| 8,358,350 | B2 * | 1/2013 | Watanabe | 348/222.1 |
| 8,462,226 | B2 * | 6/2013 | Kameyama | 348/222.1 |
| 2004/0125984 | A1 * | 7/2004 | Ito et al. | 382/103 |
| 2004/0207743 | A1 * | 10/2004 | Nozaki et al. | 348/333.12 |
| 2004/0236791 | A1 * | 11/2004 | Kinjo | 707/104.1 |
| 2005/0052533 | A1 * | 3/2005 | Ito et al. | 348/169 |
| 2005/0093984 | A1 * | 5/2005 | Martins et al. | 348/207.99 |
| 2005/0179780 | A1 * | 8/2005 | Kikkawa et al. | 348/207.99 |
| 2005/0270399 | A1 * | 12/2005 | Kawaguchi et al. | 348/333.11 |
| 2006/0055784 | A1 * | 3/2006 | Sugihara et al. | 348/207.99 |
| 2006/0072813 | A1 * | 4/2006 | Matsumoto et al. | 382/162 |
| 2006/0274960 | A1 * | 12/2006 | Tamaru | 382/274 |
| 2007/0098396 | A1 * | 5/2007 | Watanabe et al. | 396/374 |
| 2008/0024643 | A1 * | 1/2008 | Kato | 348/333.01 |
| 2009/0003652 | A1 * | 1/2009 | Steinberg et al. | 382/103 |
| 2009/0052741 | A1 * | 2/2009 | Abe | 382/103 |
| 2009/0262213 | A1 * | 10/2009 | Watanabe | 348/222.1 |
| 2009/0303342 | A1 * | 12/2009 | Corcoran et al. | 348/222.1 |
| 2010/0074557 | A1 * | 3/2010 | Oku et al. | 382/291 |
| 2010/0239125 | A1 * | 9/2010 | Chang et al. | 382/103 |
| 2011/0019026 | A1 * | 1/2011 | Kameyama | 348/222.1 |
| 2011/0176733 | A1 * | 7/2011 | Ch Ien | 382/195 |
| 2011/0279709 | A1 * | 11/2011 | Nonaka et al. | 348/231.6 |
| 2012/0020550 | A1 * | 1/2012 | Zhou | 382/155 |
| 2012/0129605 | A1 * | 5/2012 | Livet et al. | 463/39 |
| 2012/0288151 | A1 * | 11/2012 | Kido | 382/103 |
| 2012/0314902 | A1 * | 12/2012 | Kimura et al. | 382/103 |
| 2013/0070105 | A1 * | 3/2013 | Ike et al. | 348/169 |
| 2013/0070973 | A1 * | 3/2013 | Saito et al. | 382/118 |
| 2013/0177204 | A1 * | 7/2013 | YUN et al. | 382/103 |

* cited by examiner

*Primary Examiner* — Michael Osinski

(74) *Attorney, Agent, or Firm* — Brooks, Cameron & Huebsch, PLLC

(57) ABSTRACT

Image stabilization devices, methods, and systems are described herein. One image stabilization device includes a sensor having an array of pixels, wherein the sensor is configured to track a moving object using a number of the pixels, wherein the number of the pixels track only a particular portion of the moving object, and form an image of the moving object using the number of the pixels and their neighboring pixels that were not used to track the moving object.

14 Claims, 4 Drawing Sheets

IMAGE STABILIZATION DEVICES, METHODS, AND SYSTEMS

GOVERNMENT RIGHTS

The subject matter of this disclosure was made with government support under Contract Number W911NF-10-C-0022 awarded by the Intelligence Advanced Research Projects Activity (IARPA). Accordingly, the U.S. Government has certain rights to subject matter disclosed herein.

TECHNICAL FIELD

The present disclosure relates to image stabilization devices, methods, and systems.

BACKGROUND

In conventional imaging of moving objects, the motion of the object is frozen using very short exposures in order to prevent image degradation caused by motion blur. However, because shortening the exposure may need to be compensated for by increasing illumination power, such an imaging approach may require a flash strobe or other illumination source. Accordingly, conventional imaging approaches may become useless in scenarios when the use of additional illumination is either impossible, for example when the object is a long distance away, or undesirable. Regardless of the underlying reasons, such situations can be referred to as low light conditions.

Imaging of moving objects in low light conditions can be accomplished using orthogonal transfer charge-coupled device (OTCCD) sensors. For example, image stabilization systems using OTCCD sensors can stabilize the projection of a moving object onto the sensor by shifting the sensor's array so as to counter the motion without physically moving the sensor chip. This image projection stabilization can be performed by a control system that optically measures the actual location of the moving subject in the image and shifts the OTCCD array in real time to track the motion of the subject projection onto the sensor as close as possible.

Image stabilization systems using OTCCD sensors, however, may also include an additional (e.g., tracker) sensor (e.g., a CCD or CMOS sensor) that is used to optically track the moving object projection onto the sensor surface. That is, such image stabilization systems may include two different, separate sensors (e.g., arrays): a tracker sensor that tracks the moving object, and an OTCCD (e.g., target) sensor that forms the stabilized image of the moving object.

Accordingly, the energy of the light arriving from the moving object must be split into two duplicate images for the two different sensors, with one image projected onto the tracker sensor and the other image projected onto the OTCCD sensor. However, in low light conditions, only a limited amount of energy may arrive from the moving object, and splitting the arriving energy divides this limited amount of energy even further between the two sensors, which can adversely affect the performance of the sensors. For example, diverting part of the available energy to the tracker sensor can deprive the OTCCD sensor of some of the available energy (e.g., photons), which can result in the need to extend (e.g., increase) the exposure time of the OTCCD sensor. Further, special optics (e.g., beam splitters) may be needed to split the arriving energy, which can increase the size, cost, and/or complexity of the image stabilization system.

Additionally, such image stabilization systems may be unable to produce useful images of multiple objects moving in different directions. Rather, such image stabilization systems may only be able to produce useful images of a single moving object.

DETAILED DESCRIPTION

Figure 1:
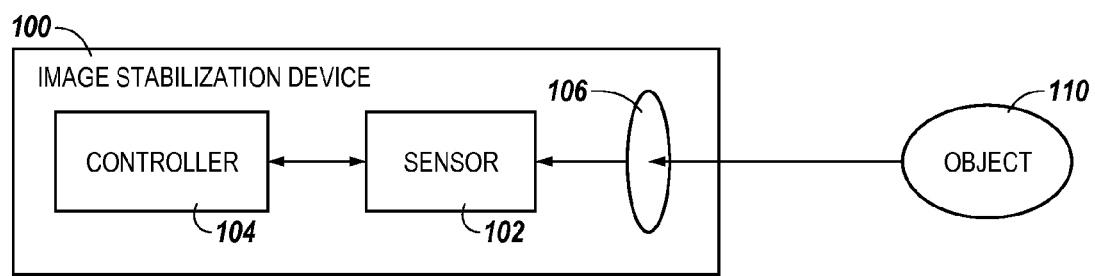
FIG. 1 illustrates an image stabilization device in accordance with one or more embodiments of the present disclosure.

Image stabilization devices, methods, and systems are described herein. For example, one or more embodiments include a sensor having an array of pixels, wherein the sensor is configured to track a moving object using a number of the pixels, wherein the number of the pixels track only a particular portion of the moving object, and form an image of the moving object using the number of the pixels and their neighboring pixels that were not used to track the moving object.

Image stabilization devices, methods, and systems in accordance with one or more embodiments of the present disclosure may include a single sensor (e.g., instead of two different and/or separate sensors). Accordingly, image stabilization devices, methods, and systems in accordance with one or more embodiments of the present disclosure may not have to split the energy (e.g., light) arriving from a moving object between two or more receptor arrays (e.g., between its tracker and target arrays), which can increase the performance of the image stabilization devices, methods, and systems as compared with previous approaches (e.g., image stabilization devices, systems, and methods having two different, separate sensors). For example, the exposure time of image stabilization devices, methods, and systems in accordance with one or more embodiments of the present disclosure may be reduced as compared with previous approaches as a result of not splitting the arriving energy.

Further, by not splitting the energy arriving from a moving object between two or more receptor arrays, image stabilization devices, methods, and systems in accordance with one or more embodiments of the present disclosure may not need special optics, such as beam splitters. Accordingly, image stabilization devices, methods, and systems in accordance with one or more embodiments of the present disclosure may have a lower size, cost, and/or complexity as compared with previous approaches. Additionally, image stabilization devices, methods, and systems in accordance with one or more embodiments of the present disclosure may be able to produce useful images of multiple objects moving in different directions.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3.

As used herein, "a" or "a number of" something can refer to one or more such things. For example, "a number of pixels" can refer to one or more pixels.

FIG. 1 illustrates an image stabilization device 100 in accordance with one or more embodiments of the present disclosure. As shown in FIG. 1, image stabilization device 100 includes a single sensor (e.g., sensing element) 102 and a controller 104 coupled to (e.g., in communication with) sensor 102. Sensor 102 may be the only sensing element of image stabilization device 100. That is, image stabilization device 100 may not include multiple different and/or separate sensing elements, such as separate tracker and OTCCD (e.g., target) sensors.

Sensor 102 can include an array of pixels (not shown in FIG. 1). Sensor 102 can track a moving object (e.g., the motion of the moving object) using a small number (e.g., one or a few) of the pixels. However, rather than tracking the moving object as a whole, the pixel(s) can represent only a particular portion of (e.g., a particular point or small area on) the moving object, as will be further described herein. Sensor 102 can form an image of the moving object using the pixel(s) used to track the moving object and their neighboring (e.g., adjacent) pixels that were not used to track the moving object. For example, sensor 102 can form an image of the moving object from one or more scene fragments, each centered at its own such particular portion and including its neighboring pixels, which are presumably moving along with it. The fragments may be obtained at different times and/or periodically updated at different rates. The rates, which implicitly define the fragments' exposures, can be determined internally by sensor 102 using information extracted from the pixels that comprise their particular portions, and may not be able to be controlled directly by a user.

As an example, sensor 102 (e.g., the pixels of sensor 102) can receive energy from a moving object, such as object 110 illustrated in FIG. 1. The received energy can be, for instance, light reflected and/or emitted from the moving object. The moving object (e.g., object 110) can be any type and/or shape, and can be moving in any direction relative to image stabilization device 100.

As shown in FIG. 1, sensor 102 can receive the energy from the moving object via a lens (e.g., lens 106) of image stabilization device 100. Lens 106 can be any type of conventional lens. As illustrated in FIG. 1, the energy from the moving object is not split before reaching sensor 102. That is, image stabilization device 100 may not include beam splitting optics.

Sensor 102 can identify a particular portion (e.g., a marker) of the moving object using a portion of the received energy (e.g., the energy received by the tracker pixel(s)). The marker can be a small, distinctive portion of and/or point on the moving object, and its location can be referenced by a single pixel. For example, the marker can be a point or small area on the moving object that projects an irradiance profile on the sensor with a unique Gaussian curvature (e.g., a curvature that is different than the curvature of the rest of the object), such as a maximum or minimum Gaussian curvature (e.g., a curvature that is either greater or smaller than the curvature of the rest of the object), which can jointly be referred to as extrema, or a measure related to it, such as, for instance, the absolute value of the Gaussian curvature.

As an example, sensor 102 (e.g., the hardware of sensor 102) can include a pre-defined, generic irradiance surface curvature measure template built into sensor 102 during manufacture that is good for any image. The pre-defined, generic irradiance surface curvature measure template can be, for instance, a Gaussian curvature or total curvature template. Sensor 102 can identify the marker by locating a maximum of the pre-defined, generic irradiance surface curvature measure template, as will be further described herein (e.g., in connection with FIGS. 2 and 3).

Sensor 102 can track the moving object, or more typically, its fragment, by tracking only the identified marker (e.g., rather than the whole moving object). Neither the number of markers nor their locations may be a priori predefined by a user. Moreover, not all markers may come from a single object, but may belong to different moving objects within a scene. Sensor 102 can establish the markers during its operation depending on the scene at which it is looking. With no illumination under its control, sensor 102 may be opportunistic, and some scenes may be easier to image than others.

Sensor 102 can identify and track the marker using charges (e.g., electrons) into which the light energy received by the tracking pixel(s) was converted, and sensor 102 can form the image of the moving object using charges (e.g., electrons) contained in the energy received by the target pixels that form the neighborhoods of the markers. Such a neighborhood of a marker can be referred to as its receptive field. For example, sensor 102 can identify and track the marker by sensing (e.g., measuring) the electric fields generated by the charges in the energy received by the tracking pixel(s), and sensor 102 can form the image of the moving object by counting the number of charges in the energy received by the target pixels. The charges used to identify and track the marker and the charges used to form the image of the moving object may be the raw charges contained in the received energy (e.g., rather than digitized values of the charges).

In some embodiments, sensor 102 can track and form images of multiple moving objects that are moving in different directions and/or at different velocities at the same time. For example, while receiving the energy from object 110, sensor 102 can also receive energy (e.g., light) from an additional object (not shown in FIG. 1) that is moving in a different direction than object 110. Sensor 102 can identify a marker of the additional moving object using a portion of the energy received from the additional moving object (e.g., the energy received by additional tracker pixel(s) of the array), and track the additional moving object while tracking object 110 by tracking only the identified marker of the additional moving object (e.g., rather than the whole additional moving object) with the additional tracker pixel(s). Sensor 102 can form an image of the additional moving object while forming an image of object 110 using the energy received by its receptive field.

Figure 2:
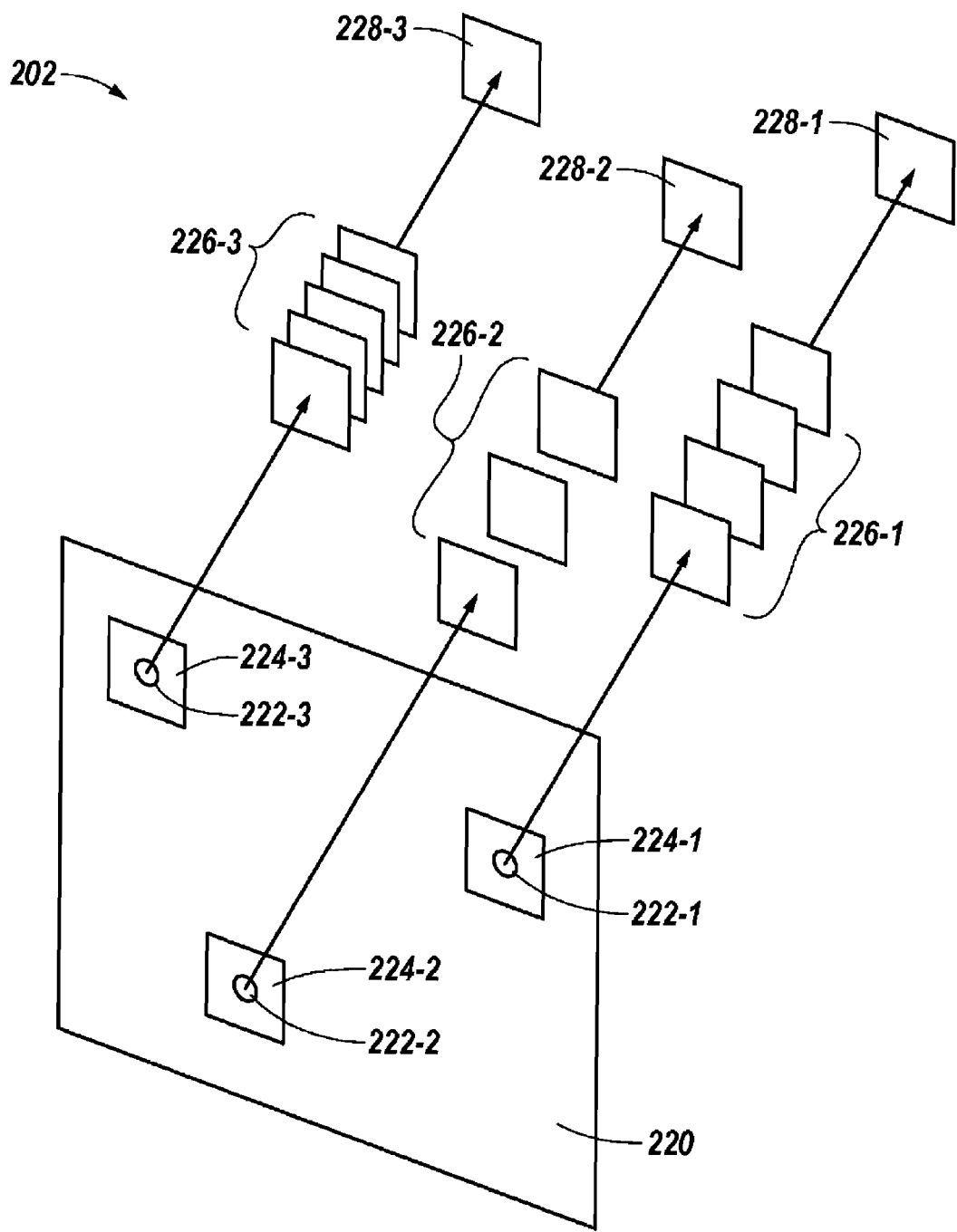
FIG. 2 is a conceptual illustration of a sensor of an image stabilization device in accordance with one or more embodiments of the present disclosure.
Figure 3:
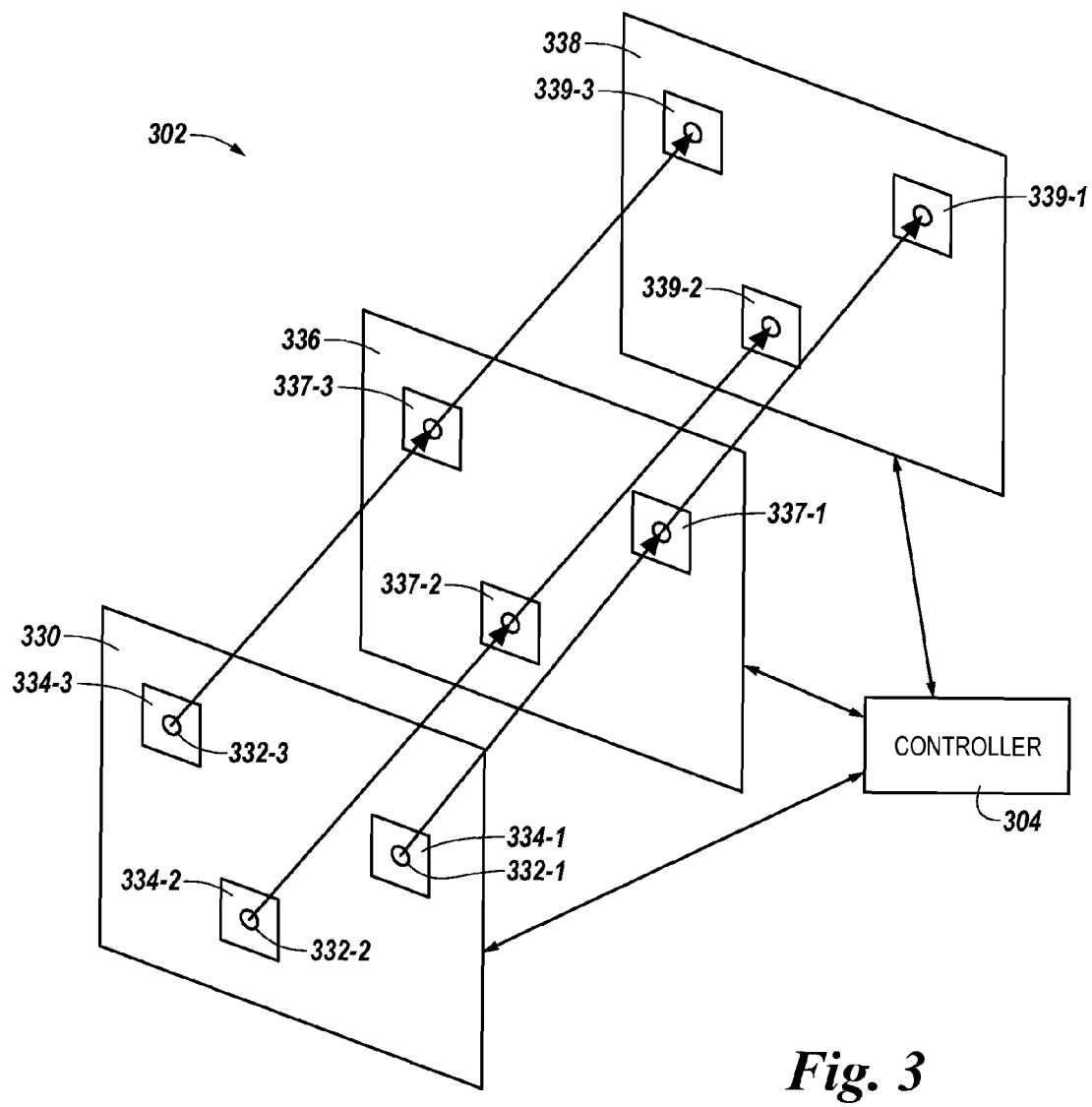
FIG. 3 illustrates a sensor of an image stabilization device in accordance with one or more embodiments of the present disclosure.

FIG. 2 is a conceptual illustration of a sensor 202 of an image stabilization device in accordance with one or more embodiments of the present disclosure. FIG. 3 illustrates a sensor 302 of an image stabilization device in accordance with one or more embodiments of the present disclosure. Sensors 202 and 302 can be, for example, sensor 102 of image stabilization device 100 previously described in connection with FIG. 1.

As shown in FIGS. 2 and 3, sensors 202 and 302 include receptor arrays 220 and 330, respectively, of pixels. Receptor arrays 220 and 330 can receive energy from a moving object (e.g., object 110) and identify a particular portion (e.g., a marker 222) of the moving object using a portion of the received energy, as previously described herein in connection with FIG. 1. Each pixel of receptor arrays 220 and 330 can include a receptor well in which photons of the received energy are converted into electrons and then held awaiting further processing. The pixels of receptor arrays 220 and 330 can be, for example, etched in a silicon substrate.

Using FIG. 2, the sensor function can be explained as follows. The photoreceptor in each pixel of array 220 keeps converting the incident photons into electrons, which are collected in the receptor's potential well and counted in a non-destructive manner (e.g., by measuring the electric field that surrounds the electrons, without taking them out of the well). While doing the collecting, each pixel continuously compares its electron count to a threshold, which may be globally set by a user. The threshold can correspond to the minimum number of electrons that need to be collected in order for the sensor to establish with a user-defined probability of error that the value of the Gaussian curvature (or some other Gaussian curvature related measure of local appearance uniqueness) the sensor has calculated is correct and not a statistical fluke arising from the stochastic nature of the incident photon streams. This may be needed because the calculations are generally based on small electron counts whose random fluctuations may not be smoothed out by statistical averaging.

Once the electron count of a pixel meets or exceeds the threshold, the pixel determines (e.g., calculates) the Gaussian curvature (or a related measure) at its location. Although the calculated value is associated with the pixel, it is a local, rather than point, operation because the calculation involves electron counts from a small set of pixels 222 adjacent the pixel, which can be considered the center of the set of pixels 222. The pixel may also compare the calculated value (e.g., the absolute value of the calculated value) to another threshold which defines the minimum curvature a pixel must have in order to be considered. If both thresholds are met or exceeded, then the pixel can identify a locally unique feature of the irradiance profile projected on the sensor by the moving object, which can be referred to as the marker. This pixel can be referred to as a master pixel, and its neighboring pixels can be referred to as a receptive field. The amount of time the pixel takes to determine that it is the master pixel can be referred to as a cycle period, and represents the exposure time used to produce an image of the receptive field, which can be referred to as a snapshot. The snapshots triggered by different master pixels 222 do not cover the entire array 220, but rather only their receptive fields 224.

The master pixels are not pre-defined by sensor design, but rather can emerge spontaneously in response to the scene during sensor operation. Any pixel can become the master pixel using the electron counts determined by it and its neighbors. Consequently, the number and/or locations of the master pixels in array 220 can vary in time as some object markers may disappear from a dynamically changing scene and new master pixels appear in the course of the sensor operation. For example, in the embodiment illustrated in FIG. 2, receptor array 220 includes three master pixels (e.g., pixels at the center of marker areas 222-1, 222-2, and 222-3) at different locations in the arrays. The neighboring pixels of the master pixels within areas 222-1, 222-2, and 222-3 were used to calculate the markers referenced by the master pixels and establish their local uniqueness. The larger neighborhoods 224-1, 224-2, and 224-3 form the receptive fields surrounding each master. Further, although the receptive fields shown in the embodiments illustrated in FIGS. 2 and 3 are the same size and shape, embodiments of the present disclosure are not so limited, and can include receptive fields having different sizes and/or shapes, as will be further described herein.

A pixel becoming a master pixel (e.g., the promotion of the pixel to master pixel) can initiate a new processing cycle for the master pixel and its receptive field. The processing cycle may begin by the master pixel reporting (e.g., announcing) its location in the receptor array to the controller of the image stabilization device (e.g., controller 104 previously described in connection with FIG. 1 and/or controller 304 illustrated in FIG. 3). The master pixel's reporting of its location can be referred to as a firing of the master pixel. The controller can constantly monitor the receptor array by periodically scanning the array for such firings. For instance, a firing can set up a flag in registers attached to the edges of the receptor array, which can be periodically scanned by the controller at a high frequency.

The firing of the master pixel may force all pixels comprising its receptive field, including those used to determine the master, to send the charges collected in the potential wells of their photoreceptors to charge shift register 226 as a new snapshot of the field. Each square in charge shift register 226 represents a different snapshot. In the embodiment illustrated in FIG. 2, the snapshots are shown stacked to form queues of different lengths. In order to convey a sense of asynchronicity, the conceptual illustration shown in FIG. 2 is drawn as if it has the time axis pointing in the direction of the arrows indicating data transfers. The queues begin and end at different times and have different lengths as the markers that were at their inception appear and disappear in the scene. The snapshots in the queues have different spacing, reflecting their different cycle periods. Thus, for example, queue 226-3 is a rapid sequence of five snapshots, which started later than the slower sequence of queue 226-2. The snapshots are underexposed images of the scene fragments captured within each receptive field, whose exposures can be determined by their cycle periods.

Receptive fields can be considered regions of interest centered at the master pixels. They can be dynamically created by the controller whenever a new master pixel is detected, and may cease to exist after their charges are transferred into the queue because the life span of each master pixel may only be a single cycle.

The charge shift registers may be dynamically allocated, maintained, and/or dismantled by the controller. However, their life spans may be longer than that of the receptive fields, because they are determined by the marker visibility in the scene. For example, if a master pixel emerges at a location of array 220 near which no previous master was recently found, the controller can set up a receptive field for the master pixel and assign it a new charge shift register. Otherwise, the controller may assume that this master is a recurrence of a previous master pixel for which a register already exists. In such a case, the controller may dynamically define the receptive field for the master pixel, making it the same size as before, and shift the snapshots already in the register forward to make room for the newly arriving snapshot as the last item in the queue.

Sending the receptive field charges out can drain the potential wells of the receptive field 224 and master 222 pixels and start integrating the incoming photons anew, potentially beginning a new cycle. Draining the wells can reset all pixels within the receptive field and inhibit the competition of also-runs for master pixel during a single cycle.

In situations in which a new master near the previous location does not emerge within a preset time, the controller can detect the inactivity and initiate a stabilization process. For example, the controller can push the first snapshot in queue 226 out into charge accumulator 228, retrieve the master location of the second snapshot (which is now at the head of the queue), and compare it to the master location of the first snapshot (which is now in the charge accumulator). If the two locations are different, the controller can shift the second snapshot up or down and/or right or left accordingly, and then send the shifted snapshot to charge accumulator 228 where it is merged with the previous (e.g., first) snapshot. This process can be repeated until the queue is empty. The stabilized image of the receptive field created from the shifted snapshots can then be output into the visual data stream, after which the charge shift register can be dismantled, releasing its hardware for new markers which may be detected somewhere in the scene in the future and their receptive field snapshots.

The overall exposure of a stabilized receptive field can be the sum of all cycle periods in its queue. Because the imaging process can be driven by the scene itself, some objects may be captured better than others, or not at all.

Each stabilized image of a receptive field typically represents only a scene fragment. A single moving object may give rise to multiple fragments, which the controller (or a post-processor) can recognize as being associated with a single object. In such instances, each stabilized image of a receptive field in the sensor's output data stream can be accompanied by metadata that include a list of master pixel locations, which may be the same list that has already been used for aligning the snapshots before their fusion in the charge accumulator. The sequence of locations can be seen as the sampling of the trajectory of the master pixel motion in array 220. If two or more different master pixels exhibit similar trajectories, the controller (or post-processor) can conclude that they likely are associated with the same moving object, and adjust the shape and/or size of the receptive fields so that they encompass both markers, even though their sampling instants (e.g., firings) and/or sampling rates (e.g., cycle periods) may be different. In contrast, different trajectories may imply that the master pixels may be associated with different objects, and therefore should not be combined. As a result, sensor 220 can provide a form of scene segmentation.

Sensor 202 may not allow a user to directly set the exposure time. Rather, once turned on, the sensor may produce streams of data comprising stabilized images of the receptive fields accompanied by their motion trajectory metadata as they emerge and eventually cease to exist as moving objects disappear from the sensor's field of view or well lit parts of the scene. The user may not be able to directly and/or individually control the formation of each receptive field or its exposure. Rather, the two may be controlled indirectly, by changing the master pixel formation rules via the thresholds. Their values may also affect the quality of the resulting visual data and/or the sensitivity of the sensor.

Upon the firing of a master pixel, sensor 302 can transfer all charges accumulated by its neighboring pixels in the receptive field out of the neighboring pixels (e.g., drain the potential wells of the neighboring pixels). For example, the neighboring pixels constituting the receptive field can transfer their accumulated charges to a charge buffer. For instance, in the embodiment illustrated in FIG. 3, the charges accumulated by receptive fields 334-1, 334-2, and 334-3 are transferred to charge buffers 337-1, 337-2, and 337-3 allocated within charge buffer array 336. The transfers are initiated by the firing of the receptive fields' master pixel and may not by synchronized by controller 304. Pixels in receptive field array 330 which do not belong to the receptive field being transferred are not affected by the firing and continue collecting the photo electrons in their potential wells.

The content of the charge buffer (e.g., the charges transferred to the charge buffer from the receptive fields) can be referred to as a snapshot (e.g., a receptive field snapshot). For example, in the embodiment illustrated in FIG. 3, charge buffer array 336 includes the charge buffers 337-1, 337-2, and 337-3, which temporarily hold snapshots represented by the charges received from receptive fields 334-1, 334-2, and 334-3, respectively. In contrast to the shift registers 226 which are intentionally drawn merely as concepts to convey the sense of the temporal flow, charge buffer array 336 can be understood as a schematic depiction of electronic hardware, in which any temporal relationships are absent. For example, the areas 337 illustrated in FIG. 3 can be understood as parts of charge buffer array that are temporality allocated by controller 304 to store the snapshots arriving from receptor array 330. In contrast to FIG. 2, in which the queues are illustrated so as to explicitly show when in time individual snapshots arrive, the charge buffer schematic depiction 336 does not convey any temporal information. Generally, those events may not occur at the same instant, as is better illustrated in FIG. 2.

Upon the transfer of the charges out of the neighboring pixels in a receptive field, all its pixels have their potential wells drained of their charges, both its master and the field itself vanish and the pixels can begin to collect new electrons, re-entering the competition for a new master which has been running uninterrupted in the rest of the array 330. This way sensor 302 can repeat the above process to determine a new master pixel(s). For example, each pixel of receptor array 330 can perform an additional (e.g., new) comparison of the number of electrons collected in its potential well to the minimum electron threshold, and determine, if the threshold is met or exceeded based on the new comparison, a curvature at its location. Each new pixel whose number of electrons meets or exceeds the minimum electron threshold can perform a new comparison of the curvature and the minimum curvature threshold. The first pixel(s) to determine that the number of electrons collected in its potential well meets or exceeds the minimum electron threshold and the curvature meets or exceeds the minimum curvature threshold can be the new master pixel(s), and the new master pixel(s) can report its location in the receptor array to the controller of the image stabilization device (e.g., the new master pixel(s) fires). The charges accumulated by the neighboring pixels 332 and 334 of the new master pixel(s) can be transferred out to the charge buffer 336, whose previously held snapshot(s) have been cleared while the electrons making up the current snapshots were still being collected.

Snapshots, presumably tracking the same marker as it moves in (e.g., across) the scene and spatially referenced by the master pixel location, may arrive in a sequence. The location of the first snapshot in a new sequence (e.g., the snapshot corresponding to the receptive field of its founding master) can serve as a reference location so that the first snapshot need not be aligned and instead may be readily transferred (e.g., moved) to a charge accumulator. For example, in the embodiment illustrated in FIG. 3, snapshots 337-1, 337-2, and 337-3 are transferred to charge accumulators 339-1, 339-2, and 339-3, respectively, of charge accumulator array 338. The charge accumulators can have the same dimensions as the charge buffers. Each charge accumulator can include an accumulator well, in which the electrons of the snapshots are received and accumulated. The capacity of the accumulator wells may be one to two orders of magnitude larger than the capacity of the receptor wells.

The controller of the image stabilization device can compare the location in the receptor array of a master pixel with the location in the receptor array of the previous master pixel. For example, the controller can compare the location in the receptor array of the new (e.g., second) master pixel in a sequence with the location in the receptor array of the first (e.g., founding) master pixel. Instead of forming a queue as depicted in FIG. 2 for the sake of explanation and postponing the snapshot spatial registration until after the entire sequence becomes available, the controller can then immediately shift (e.g., up or down and/or left or right), based on the comparison of the locations, the first snapshot (e.g., the snapshot in the charge accumulator that corresponds to the charges accumulated by the first master pixel's neighboring pixels) and/or the second snapshot (e.g., the snapshot in the charge buffer that corresponds to the charges accumulated by the second master pixel's neighboring pixels) such that the first and second snapshots are registered. For instance, the controller can shift the second snapshot to align the second master pixel with the first master pixel, and then fuse the individual pixel charges of the second snapshot with the corresponding individual pixel charges of the first snapshot. Accordingly, the snapshot shifting is reactive to, rather than predictive of, the motion of the object which can increase tracking precision and/or accuracy as compared with previous approaches (e.g., approaches in which the shifting is based on a predictive model of the motion of the object). Processing the snapshots in real time as they are arriving can allow the charge shift registers to be replaced with charge buffers, which can greatly reduce the sensor chip complexity.

This process can be repeated for each sequence associated with a particular master until the current sequence ends, after which the charge accumulator will hold a stabilized image of the associated receptive field (e.g., the image is stabilized during the transfer of electrons from the buffer wells into the accumulator wells). That is, the charge buffer is a buffer in which a snapshot can be temporarily held while it is being properly shifted before its content is fused with what is already held in the accumulator, and the accumulator is where the sequence of properly registered receptive field snapshots is fused into the stabilized receptive field image. The images thus emerging in the areas 339 are scene fragments from which scene images are eventually assembled.

The exposure of the stabilized image of a receptive field is the sum of the cycle periods of the snapshots that were fused to create it. Different receptive fields, even if they relate to markers extracted from the same moving object, may have different exposures, because the master pixel firing can depend more on local contrast than scene illumination. Markers found in high contrast areas can produce shorter cycle periods for the same reliability of motion tracking than those located in low contrast areas. Since contrast of a moving object is reduced by the motion blur, the degree of the tolerable image quality degradation is the real determinant of exposure times. The faster the object is moving, the shorter the cycle periods need to be to stabilize the image of the moving object. However, the cycle period length is bounded from below by the contrast of the markers available in the scene and thus beyond user control.

A user can specify the desired visual data quality by setting the sensor thresholds, but the specification may not be consistent with the scene content and/or dynamics, and thus may not be attainable. The sensor can set the cycle periods for each receptive field on its own, and can do so in a way that approaches the user specification.

The controller can annotate each fragment with location trajectory metadata before pushing it out into the output stream.

Some sequences may be so long that the charges being gathered in the accumulator may exceed the capacity of its wells. To avoid the loss of information the controller may continue to fuse snapshots in a charge accumulator area 339 until the brightest pixel within it saturates, at which point the content of the accumulator may be released into the output stream, freeing it to accommodate the remaining part of the sequence. In such an instance, the remaining part can be treated as if it were a new sequence.

In some instances, the controller may stop fusing pixels in the accumulator because the accumulator is not receiving any more snapshots due to, for instance, the sequence marker moving out of the sensor's field of view or the object significantly changing its viewing pose. In such instances, the controller may instruct the accumulator to release its content on the basis of its inactivity after a certain time.

While markers can emerge spontaneously in the receptor array 330, the receptive fields 334, charge buffers 337, and accumulators 339 can be dynamic structures, set up on demand in real time by controller 304 within the hardware arrays 330, 336, and 338, respectively, for each new marker found in the scene. Each structure can be dismantled and released for future reuse as soon as the founding marker of its snapshot sequence can no longer be identified in the receptor array data.

The stabilized images of receptive fields formed in the areas 339 of the accumulator array 338 represent scene fragments from which scene images are eventually assembled. The assembly may be done outside the sensor. Upon its completion, the controller can annotate each fragment with location trajectory metadata before pushing it out into the output stream, which can be a spatio-temporal data structure that can be imagined as a bundle of time-stamped fragment streams that a postprocessor can assemble into a format best suited for a given computer vision task. If needed, the fragments can be assembled into a sequence of rectangular frames resembling conventional video.

The diagram in FIG. 3 illustrating the sensor's internal structure may not be interpreted as three standalone devices or silicon chips connected by external wires. All signal paths in FIG. 3, which point from receptor array 330 through charge buffer array 336 to accumulator array 338 can carry information encoded in electric charges. The signal values can be electron counts and can be conveyed by the electrons themselves rather than by means of voltages or currents to which the counts were converted. Since the charges can not be taken out of a chip and transmitted over wires, all three arrays may be implemented on a single chip. Controller 304 can be external. Working directly with charges can eliminate the need for charge-to-voltage or charge-to-current conversion, which can be the dominant source of noise in CCD and/or CMOS sensors. The high conversion noise levels may dictate exposure times that could have been cut, providing that such conversion is avoided, to a fraction of their length without increasing illumination and still achieving a comparable sensor performance. In turn, short exposures can enable the sensor to produce snapshots with minimal motion blur degradation even under ambient light from which high quality stabilized images can be constructed.

Although the receptive fields shown in the embodiments illustrated in FIGS. 2 and 3 are the same size and shape, embodiments of the present disclosure are not so limited. For example, over time the controller may create receptive fields that have a customized size and/or shape. For instance, the controller can compare the master pixel location trajectories (e.g., plot on a graph) and the times at which they arrive at the controller. If two or more accumulators share similar graphs, their markers may have originated from the same moving object and thus their receptive fields can be treated jointly as one larger receptive field. In such an instance, the controller can create a single, contiguous receptive field that can take the shape of a rectangle or polygon enclosing the original receptive fields. This can stabilize what would have been gaps lacking markers between the receptive fields.

Figure 4:
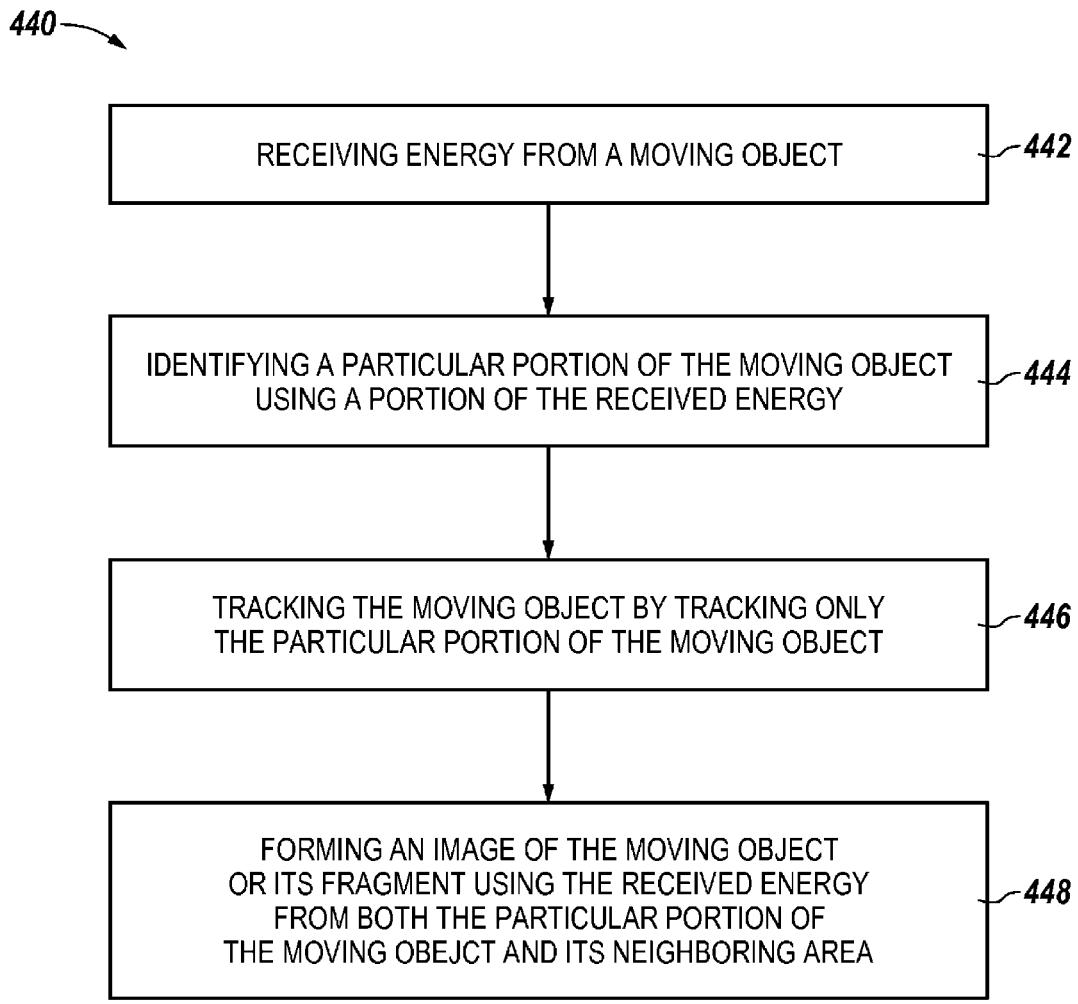
FIG. 4 illustrates a method of operating an image stabilization device in accordance with one or more embodiments of the present disclosure.

FIG. 4 illustrates a method 440 of operating an image stabilization device in accordance with one or more embodiments of the present disclosure. The image stabilization device can be, for example, image stabilization device 100 previously described in connection with FIG. 1.

At block 442, method 440 includes receiving energy from a moving object. The moving object can be, for example, object 110 previously described in connection with FIG. 1. The energy can be received from the moving object by, for example, a sensor (e.g., sensor 102 previously described in connection with FIG. 1) of the image stabilization device in a manner analogous to that previously described in connection with FIG. 1.

At block 444, method 440 includes identifying (e.g., by the sensor) a particular portion (e.g., a marker) of the moving object using a portion of the received energy. The particular portion of the moving object can be a small, distinctive portion of and/or point on the moving object in a manner analogous to that previously described in connection with FIG. 1. The portion of the received energy used to identify the particular portion of the moving object can be, for example, the energy received by a small group of pixel(s) of the sensor, which are exposed to the irradiance profile from the scene suitable to serve as a marker, as previously described in connection with FIG. 1.

At block 446, method 440 includes tracking (e.g., by the sensor) the moving object by tracking only the particular portion of the moving object (e.g., rather than tracking the whole moving object). The particular portion of the moving object can be identified and tracked, for example, using charges (e.g., electrons) contained in the portion of the received energy, in a manner analogous to that previously described in connection with FIG. 1.

At block 448, method 440 includes forming (e.g., by the sensor) an image (e.g., a stabilized image) of the moving object or its fragment using the received energy from both the particular portion of the moving object and its neighboring (e.g., adjacent) area. The image of the moving object or its fragment can be formed, for example, in a manner analogous to that previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An image stabilization device, comprising:
a sensor having an array of pixels, wherein the sensor is configured to:
identify a particular portion of a moving object by:
counting, by each pixel, a number of electrons collected in its potential well;
comparing, by each pixel, the number of electrons collected in its potential well to an electron threshold;
determining, by any pixels whose number of electrons collected in their respective potential well meets or exceeds the electron threshold, a Gaussian curvature at their respective location;
comparing, by the pixels whose number of electrons collected in their respective potential well meets or exceeds the electron threshold, an absolute value of their respective determined Gaussian curvature to a curvature threshold; and
identifying, by a number of pixels whose number of electrons collected in their respective potential well meets or exceeds the electron threshold and whose absolute value of their respective determined Gaussian curvature meets or exceeds the curvature threshold, the particular portion of the moving object;
track the moving object using the number of the pixels, wherein the number of the pixels track only the particular portion of the moving object; and
form an image of the moving object using the number of the pixels and their neighboring pixels that were not used to track the moving object.

2. The image stabilization device of claim 1, wherein the sensor is configured to:
receive energy from the moving object; and
identify the particular portion of the moving object using the received energy.

3. The image stabilization device of claim 1, wherein the particular portion of the moving object is an area on the moving object that projects an irradiance profile on the sensor with a unique Gaussian curvature.

4. The image stabilization device of claim 3, wherein the unique Gaussian curvature is an extremum Gaussian curvature or a measure related to the extremum curvature.

5. The image stabilization device of claim 1, wherein:
the sensor includes a pre-defined, generic irradiance surface curvature measure template; and
the sensor is configured to identify the particular portion of the moving object by locating an extremum of the pre-defined, generic irradiance surface curvature measure template.

6. A method of operating an image stabilization device, comprising:

receiving, by a sensor having an array of pixels, energy from a moving object;

identifying a particular portion of the moving object using a portion of the received energy by:

counting, by each pixel, a number of electrons collected in its potential well;

comparing, by each pixel, the number of electrons collected in its potential well to an electron threshold;

determining, by any pixels whose number of electrons collected in their respective potential well meets or exceeds the electron threshold, a Gaussian curvature at their respective location;

comparing, by the pixels whose number of electrons collected in their respective potential well meets or exceeds the electron threshold, an absolute value of their respective determined Gaussian curvature to a curvature threshold; and identifying, by a number of pixels whose number of electrons collected in their respective potential well meets or exceeds the electron threshold and whose absolute value of their respective determined Gaussian curvature meets or exceeds the curvature threshold, the particular portion of the moving object;

tracking the moving object by tracking only the particular portion of the moving object; and forming an image of the moving object or its fragment using the received energy from both the particular portion of the moving object and its neighboring area.

7. The method of claim 6, wherein the method includes receiving the energy from the moving object without splitting the energy between two or more receptor arrays.

8. The method of claim 6, wherein the method includes:

receiving energy from an additional moving object while receiving energy from the moving object;

identifying a particular portion of the additional moving object using a portion of the energy received from the additional moving object;

tracking the additional moving object while tracking the moving object by tracking only the particular portion of the additional moving object; and forming an image of the additional moving object or its fragment while forming the image of the moving object or its fragment.

9. The method of claim 6, wherein the method includes identifying the particular portion of the moving object and tracking the particular portion of the moving object by sensing electric fields generated by charges in the portion of the received energy.

10. The method of claim 6, wherein the method includes forming the image of the moving object or its fragment by counting a number of charges in the received energy from both the particular portion of the moving object and its neighboring area.

11. The method of claim 6, wherein the method includes forming the image of the moving object or its fragment by counting a number of charges in the received energy from a neighboring area of the particular portion of the moving object.

12. An image stabilization device, comprising:

a single sensor having an array of pixels, wherein the single sensor is configured to:

identify a particular marker on a moving object and reference its location by a single pixel by:

counting, by each pixel, a number of electrons collected in its potential well;

comparing, by each pixel, the number of electrons collected in its potential well to a minimum electron threshold;

determining, by a pixel whose number of electrons collected in its potential well meets or exceeds the minimum electron threshold, a Gaussian curvature or a related measure at its location;

comparing, by the pixel whose number of electrons collected in its potential well meets or exceeds the minimum electron threshold, an absolute value of the determined curvature to a minimum curvature threshold; and identifying, by a pixel whose number of electrons collected in its potential well meets or exceeds the minimum electron threshold and whose absolute value of the determined curvature meets or exceeds the minimum curvature threshold, the particular marker on the moving object;

track the moving object using one of the pixels, wherein the pixel used to track the moving object tracks only the particular marker on the moving object; and form an image of the moving object using the pixel that tracks the particular marker and its neighboring pixels that were not used to track the moving object.

13. The image stabilization device of claim 12, wherein the particular marker on the moving object is a locally unique feature of an irradiance profile projected on the single sensor by the moving object.

14. The image stabilization device of claim 12, wherein:

the image stabilization device includes a controller; and the pixel whose number of electrons collected in its potential well meets or exceeds the minimum electron threshold and whose determined curvature meets or exceeds the minimum curvature threshold is configured to report its location in the array to the controller.

\* \* \* \* \*